(12) United States Patent
Mirov

(10) Patent No.: US 10,372,179 B1
(45) Date of Patent: *Aug. 6, 2019

(54) PERFORMING A POWER CYCLE RESET IN RESPONSE TO A CHANGE IN CHARGING POWER APPLIED TO AN ELECTRONIC DEVICE

(71) Applicant: Verily Life Sciences LLC, Mountain View, CA (US)

(72) Inventor: Russell Norman Mirov, Los Altos, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/600,745

(22) Filed: May 21, 2017

Related U.S. Application Data

(63) Continuation of application No. 14/485,648, filed on Sep. 12, 2014, now Pat. No. 9,678,547.

(51) Int. Cl.
*G06F 1/24* (2006.01)
*H02J 7/34* (2006.01)
*H02J 7/02* (2016.01)
*G06F 1/26* (2006.01)

(52) U.S. Cl.
CPC ............... *G06F 1/24* (2013.01); *G06F 1/26* (2013.01); *H02J 7/025* (2013.01); *H02J 7/345* (2013.01)

(58) Field of Classification Search
CPC .................................................... H02J 50/10
USPC ........................................................ 713/300
See application file for complete search history.

(56) References Cited

U.S. PATENT DOCUMENTS

| 5,778,238 | A | | 7/1998 | Hofhine |
| 5,963,015 | A | * | 10/1999 | Lee ..................... H02J 7/0068 |
| | | | | 320/128 |
| 6,154,675 | A | | 11/2000 | Juran et al. |
| 6,178,516 | B1 | * | 1/2001 | Meade ..................... G06F 1/24 |
| | | | | 713/300 |
| 6,288,584 | B1 | * | 9/2001 | Wu ..................... H03K 17/223 |
| | | | | 327/143 |
| 2008/0191794 | A1 | | 8/2008 | Chiu et al. |
| 2010/0231179 | A1 | | 9/2010 | Ha et al. |
| 2011/0128153 | A1 | | 6/2011 | Sims et al. |
| 2012/0099392 | A1 | | 4/2012 | Shim et al. |

(Continued)

*Primary Examiner* — Robert E Fennema
*Assistant Examiner* — Santosh R Poudel
(74) *Attorney, Agent, or Firm* — McDonnell Boehnen Hulbert & Berghoff LLP

(57) ABSTRACT

An electronic device is configured to perform a power cycle reset in response to a change in charging power applied to the device. The device includes an electrical load with a microprocessor, a battery, a charging circuit that receives power from an external power source and uses the received power to charge the battery, and a control circuit that regulates the power cycle reset operation. The power supply circuit selectively uses the battery to power the device by coupling the load to a power supply path and discharges the load by coupling the load to a discharge path. The control circuit receives, from the charging circuit, an indication of a change in power applied to the charging circuit and responsively generates a control signal and applies the control signal to the power supply circuit, which causes the power supply circuit to temporarily couple the load to the discharge path.

20 Claims, 9 Drawing Sheets

(56) References Cited

U.S. PATENT DOCUMENTS

| | | |
|---|---|---|
| 2012/0137114 A1 | 5/2012 | Tsai |
| 2012/0235715 A1 | 9/2012 | Lee |
| 2013/0293273 A1 | 11/2013 | Paul |
| 2014/0015476 A1* | 1/2014 | Kondo ................ H02J 7/0029 320/107 |
| 2014/0035634 A1 | 2/2014 | Shrivastava et al. |

* cited by examiner

PERFORMING A POWER CYCLE RESET IN RESPONSE TO A CHANGE IN CHARGING POWER APPLIED TO AN ELECTRONIC DEVICE

CROSS-REFERENCE TO RELATED DISCLOSURES

This disclosure is a continuation of U.S. patent application Ser. No. 14/485,648 filed on Sep. 12, 2014, which is incorporated herein by reference in its entirety.

BACKGROUND

Unless otherwise indicated herein, the materials described in this section are not prior art to the claims in this application and are not admitted to be prior art by inclusion in this section.

A number of scientific methods have been developed to detect and/or measure one or more physiological properties of a human. Some of these methods can be implemented in the form of portable, low-power sensing devices. Such sensing devices can be included in wearable devices that can be mounted to a human body to enable continuous sensing detection and/or measurement of the one or more physiological properties.

Wearable devices may be used to obtain information about the wearer's physical activity and/or health state. For example, a wearable device may include one or more motion sensors, such as an accelerometer or gyroscope, in order to detect movements of the wearer and determine the wearer's level of physical activity (e.g., in terms of steps taken or calories burned). Alternatively or additionally, a wearable device may include one or more biological sensors that measure biological parameters of the wearer. The measured biological parameters could include pulse rate, blood oxygenation (oximetry), blood pressure, skin temperature, galvanic skin response (GSR), or other parameters that may relate to the wearer's level of physical exertion.

Small consumer devices typically run on batteries and have complex hardware and software subsystems. Circumstances can cause these subsystems to get into a fault state. Correcting the fault state may require restarting the device by power cycling the device. For some devices, a power cycle can be initiated by removing the battery, waiting for any internal electronics to discharge, then reinstalling the battery. In some devices, a small recessed button may be provided that can be depressed to initiate a reset, such as by using a paperclip.

SUMMARY

An electronic device is configured to perform a power cycle reset in response to a change in charging power applied to the device. The device includes an electrical load with a microprocessor, a battery, a charging circuit that receives power from an external power source and uses the received power to charge the battery, and a control circuit that regulates the power cycle reset operation. The power supply circuit selectively uses the battery to power the device by coupling the load to a power supply path and discharges the load by coupling the load to a discharge path. The control circuit receives, from the charging circuit, an indication of a change in power applied to the charging circuit and responsively generates a control signal and applies the control signal to the power supply circuit, which causes the power supply circuit to temporarily couple the load to the discharge path.

Some embodiments of the present disclosure provide a body-mountable device. The body-mountable device can include a housing and electronics situated within the housing. The electronics can include a load, a power supply circuit, an energy storage device, a charging circuit, and a control circuit. The load can include a microprocessor. The energy storage device can be configured to power the load via the power supply circuit. The power supply circuit can be configured to selectively couple the load to (i) a power supply path through which the power supply circuit uses the energy storage device to power the load and (ii) a discharge path that discharges the load. The charging circuit can be configured to charge the energy storage device with power applied to the charging circuit from a power source. The control circuit can be configured to: (i) receive an indication of a change in power provided to the charging circuit, (ii) in response to receiving the indication from the charging circuit, apply a control signal to the power supply circuit for a period of time, and (iii) following the period of time, cease to apply the control signal to the power supply circuit. In response to the control circuit applying the control signal, the power supply circuit can couple the load to the discharge path so as to discharge the load during the period of time. In response to the control circuit ceasing to apply the control signal, the power supply circuit can couple the load to the power supply path. The microprocessor can be configured to perform a power-up reset in response to the power supply circuit coupling the load to the power supply path.

Some embodiments of the present disclosure provide a method. The method can include receiving, at a control circuit, an indication of a change in power provided to a charging circuit. The charging circuit can be configured to charge an energy storage device. The energy storage device can be configured to power a load via a power supply circuit. The power supply circuit can be configured to selectively couple the load to (i) a power supply path through which the power supply circuit uses the energy storage device to power the load and (ii) a discharge path that discharges the load. The load can include a microprocessor. The method can also include the control circuit applying a control signal to the power supply circuit for a period of time in response to receiving the indication from the charging circuit. The method can also include the power supply circuit coupling the load to the discharge path so as to discharge the load during the period of time in response to the control circuit applying the control signal. The method can also include the control circuit ceasing to apply the control signal to the power supply circuit following the period of time. The method can also include the power supply circuit coupling the load to the power supply path in response to the control circuit ceasing to apply the control signal. The method can also include the microprocessor performing a power-up reset in response to the power supply circuit coupling the load to the power supply path.

Some embodiments of the present disclosure provide means for receiving, at a control circuit, an indication of a change in power provided to a charging circuit. The charging circuit can be configured to charge an energy storage device. The energy storage device can be configured to power a load via a power supply circuit. The power supply circuit can be configured to selectively couple the load to (i) a power supply path through which the power supply circuit uses the energy storage device to power the load and (ii) a discharge path that discharges the load. The load can include a microprocessor. Some embodiments of the present disclosure provide means for the control circuit applying a control signal to the power supply circuit for a period of time in response to receiving the indication from the charging circuit. Some embodiments of the present disclosure provide means for the power supply circuit coupling the load to the discharge path so as to discharge the load during the period of time in response to the control circuit applying the control signal. Some embodiments of the present disclosure provide means for the control circuit ceasing to apply the control signal to the power supply circuit following the period of time. Some embodiments of the present disclosure provide means for the power supply circuit coupling the load to the power supply path in response to the control circuit ceasing to apply the control signal. Some embodiments of the present disclosure provide means for the microprocessor performing a power-up reset in response to the power supply circuit coupling the load to the power supply path These as well as other aspects, advantages, and alternatives, will become apparent to those of ordinary skill in the art by reading the following detailed description, with reference where appropriate to the accompanying drawings.

DETAILED DESCRIPTION

Figure 1A:
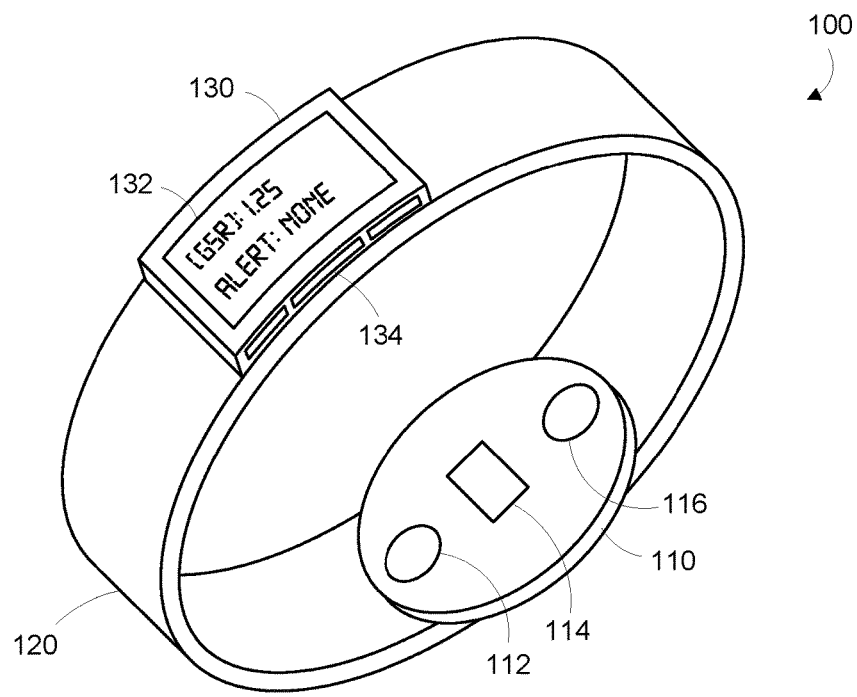
FIG. 1A shows an example wearable device, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Further, while embodiments disclosed herein make reference to use on or in conjunction with a living human body, it is contemplated that the disclosed methods, systems and devices may be used in any environment where the operation of a sensor is desired, where the sensor is powered by a rechargeable battery that can be recharged using electromagnetic energy received by a coil disposed proximate to the sensor. The environment may be any living or non-living body or a portion thereof, a gel, an emulsion, a fluid conduit, a fluid reservoir, etc. For example, one of skill in the art will recognize that the embodiments disclosed herein may be used to sense analytes present in a water treatment system.

I. Overview

A wearable device may be configured to measure one or more physiological parameters of a wearer. The physiological parameters can include galvanic skin response, pulse timing and/or rate, blood oxygenation, temperature, the concentration of one or more analytes in the blood, or some other parameters. To obtain measurements, the wearable device may include a sensor disposed in a housing of the device so as to have access to (e.g., to contact, to be able to receive light from, to be able to illuminate) the wearer's skin at a location such as the wearer's wrist, forearm, upper arm, leg, thigh, etc. With the sensor having access to the wearer's skin, electronics within the device may be used to operate the sensor to measure the one or more physiological parameters. The electronics may be powered by a rechargeable battery in the wearable device. The wearable device may further include a charging circuit for recharging the rechargeable battery and a power supply circuit that uses energy from the rechargeable battery to provide power to the remaining electronics within the device.

In some circumstances, the wearable device may enter an error state, in which hardware and/or software subsystems of the device will not continue to without undergoing a power-on reset. However, the rechargeable battery may not be accessible from the exterior of the device, and so removal of the rechargeable battery to effect a power-on reset may not be feasible. Further still, the device may not have any externally accessible ports or buttons, such as recessed buttons sometimes included on electronics devices to effect a reset operation by pressing the button with a paper clip. For instance, the wearable device may be entirely sealed to be water-resistant and/or water-proof. The present disclosure provides a system and process to cause such a device to perform a power cycle reset in response to removing the device from a power source used to charge the battery.

The wearable device includes a power supply circuit that selectively couples the electronics in the device to a power supply path, in which the electronics are powered by energy stored in the battery, and a discharge path, in which the electronics are discharged. When coupled to the discharge path, the electronics are not powered (i.e., turned off), and internal capacitances of the electronics within the device are dissipated via the discharge path. In addition, the charging circuit that charges the rechargeable battery can be configured to provide an indication of whether an external power source is providing power to the charging circuit. For example, the charging circuit may output a voltage that indicates whether the device is presently coupled to a power source for charging the battery. Upon disconnection of the device from the power source, the indicator output from the charging circuit can transition from a first voltage to a second voltage.

A control circuit can be configured to receive the indication of a change in power applied to the power circuit and responsively apply a control signal to the power supply circuit that causes the power supply circuit to discharge the electronics. The control circuit can be configured to apply the control signal for a period of time sufficient to discharge the electronics, and then cease applying the control signal. Upon ceasing application of the control signal, the power supply circuit can reconnect the electronics of the device to the power supply path, and the device can perform a power-on reset. In operation then, the control circuit causes the power supply circuit to temporarily remove power from the electronics of the wearable device. Then, upon again providing power to the electronics, the device performs a power-on initialization routine.

The control circuit can also be configured to trigger a power cycle reset in response to removal of charging power. Thus, it is not the completion of charging the battery that triggers a power-on reset, rather it is the removal (e.g., disconnection) of the external power source. As such, the charging of the rechargeable battery can start and stop multiple times (as happens once the battery is fully charged) without triggering a power cycle reset. The device will be reset upon removal of the external power source, which may be shortly before the device is returned to service.

The disclosure provides a device with a way to obtain a complete power cycle of all the internal circuitry (and software) without having to remove a battery. In addition, in the case of wearable devices with minimal user interfaces, the disclosure also provides an automatic technique in which a device removed from a charger is reset prior to being put back into service. As a result of the reset, software systems in the device are initialized in a predictable state. In some cases, a device may additionally or alternatively be configured to trigger a power-on reset upon application of external power.

II. Example Wearable Device

Wearable devices as described herein can be configured to be mounted to an external body surface of a wearer and to enable a variety of applications and functions. Such wearable devices include a housing (i.e., a rigid or semi-rigid enclosure) and a mount configured to mount a contact surface of the housing to the external body surface of the wearer. A sensor disposed on a central portion of the contact surface can detect one or more properties of the body of the wearer when the contact surface is mounted to the external body surface. Such wearable devices could enable a variety of applications, including measuring physiological information about a wearer, indicating such measured physiological information or other information to the wearer (e.g., using a vibrator, a screen, a beeper), or other functions.

FIG. 1A shows an example wearable device 100. The wearable device 100 can automatically measure a plurality of physiological parameters of a person wearing the device. The term "wearable device," as used in this disclosure, refers to any device that is capable of being worn at, on or in proximity to a body surface, such as a wrist, ankle, waist, chest, or other body part. In some examples, the wearable device(s) described herein may be configured to be removably mounted to a body surface and may include body-mounting surfaces. In order to take in vivo measurements in a non-invasive manner from outside of the body, the wearable device 100 may be positioned on a portion of the body where subsurface vasculature or other elements of the body of the wearer may be detected, which depends in part on the type of detection system used and its sensitivity. The wearable device 100 may be placed in close proximity to the skin or tissue. Depending on the mounting location of the device 100, the device may accordingly be implemented in a variety of different form factors that are configured to be mounted to a variety of different body surfaces. One such example is a wrist-mountable device that is shown in FIG. 1A. As shown in FIG. 1A, the example wrist-mounted device 100 includes a sensor housing 110, a mounting band 120, a user interface module 130.

A. Sensor(s)

Figure 1B:
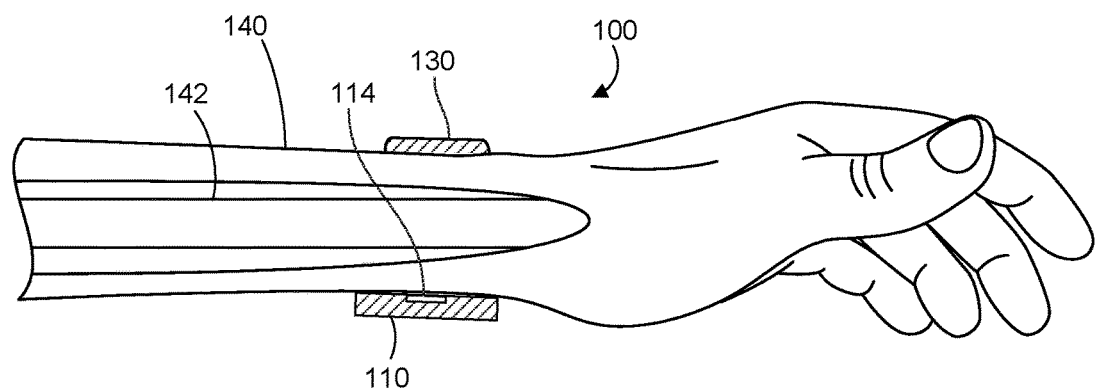
FIG. 1B is a side cross-sectional view of the example wearable device shown in FIG. 1A when worn on a wrist, according to an example embodiment.

The sensor housing 110 is disposed on the mount 120 to facilitate contact between the body surface and the sensor housing 110 when the device 100 is worn. For instance, FIG. 1B shows the example device 100 in a side cross-sectional view when the device 100 is mounted to a wrist. As shown in FIG. 1B, the sensor housing 110 is situated over the body surface (e.g., the anterior side, or palmar side, of the wrist above the ulnar artery). The sensor housing 110 may include at least one sensor for detecting at least one physiological property of the body of the wearer, which could include any parameters that may relate to the health of the person wearing the wearable device. For example, the sensor housing 110 includes a pulse rate sensor and/or pulse oximetry sensor having two light-sensitive elements 112, 116, and a light emitter 114. While the device 100 is mounted over a wrist (as in FIG. 1B), the light emitter 114 can emit light into the body tissue. Some of the emitted light is then reflected by the tissue and received by the light-sensitive elements 112, 116. The tissue of the arm 140 includes a variety of materials with different degrees of reflectivity, such as skin, muscle, bone, connective tissues, vasculature 142, etc., and so the intensity of reflected light during a given measurement depends on the composition of the tissue over the sensor. Over timescales of a few seconds the tissue composition remains fairly constant with the exception of arterial blood that traverses the vasculature 142 in a non-continuous, pulsing manner related to the wearer's heartbeat. Intensity modulations in the reflected light can be attributed to the pulsing arterial blood in the vasculature 142 (e.g., through the ulnar artery), and so the frequency of such intensity modulations can be used to determine the wearer's pulse rate.

Other sensors may additionally or alternatively be included in the sensor housing 110. The sensor housing 110 could include sensors mounted thereon for measuring blood pressure, galvanic skin response, skin temperature, analyte levels, etc. In a non-exhaustive list, the sensor housing 110 may include any one of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., magnetic resonance) sensor. For instance, the sensor housing 130 could include a sensor configured to detect a Galvanic skin resistance (GSR) of skin at the external body surface of the wearer by applying an electric potential between two probes in electrical contact with skin at the external body surface of the wearer. Additionally or alternatively, the body of the wearer (e.g., the subsurface vasculature 142) could include artificial or other contrast agents (e.g., fluorophores, fluorescent nanodiamonds, chromophores, acoustic particles, magnetic particles) functionalized or otherwise configured to enable the detection of one or more properties of the body of the wearer using a sensor mounted to the sensor housing 130. For example, a contrast agent including a fluorophore could be configured to selectively bind to an analyte of interest in the blood of the wearer, and a sensor could be operated to determine a presence, location, binding state, or other properties of the contrast agent in the blood. The determined one or more properties of the contrast agent could be used to determine the presence or concentration of the analyte in the blood of the wearer. Other contrast agents, properties of the body of the wearer, and configurations and method of operation of the a sensor are anticipated.

B. User Interface

The wearable device 100 may also include a user interface 130. Using the user interface 130, the wearer of the device may receive outputs and provide inputs to the device 100. Outputs may include, for example, recommendations or alerts based on physiological measurements obtained using the wearable device and/or other information related to the device, such as battery condition or status information. Inputs may include adjustments to settings on the device (e.g., measurement interval, data reporting format, etc.). As shown in FIG. 1A, the user interface 130 can include a display 132 for providing outputs, and buttons 134 for receiving user inputs. As shown in FIG. 1A, the display 132 can be used to render messages to be read by the wearer, such as text that indicates a measure of Galvanic skin resistance (GSR). The display could also be used to display alerts to the user. The user interface 130 may include a variety of other components to provide and/or receive information via visual component(s) (e.g., a display and/or a camera), auditory component(s) (e.g., an audio loudspeaker and/or a microphone), and/or tactile component(s) (e.g., a vibration transducer and/or an accelerometer).

In some examples, the user interface 130 may additionally or alternatively be implemented via communication between the wearable device 100 and other device(s). For instance, a wearer may receive outputs (e.g., alerts) via their cell phone, computer, or other device. The wearer may also provide inputs (e.g., to adjust settings of the device) via such other device. Accordingly, the wearable device 100 can be configured to communicate with such other devices via wireless signals, for example. In addition, the wearable device 100 may communicate with other devices, which may be used to store and/or process data related to the physiological measurements alone or in coordination with the processing performed locally by the device 100. For instance, a communicatively coupled computing system may receive data indicating measurements from the wearable device 100, and analyze those measurements to determine a health state of the wearer. Such a computing system may also store indications of wearer-associated measurements and/or health states over time, and generate reports from that information.

C. Mount

The mounting band 120 can be used to mount the device 100 at, on or in proximity to the body surface. The mount 120 may prevent the wearable device 100 from moving relative to the body to reduce measurement error and noise. In one example, as shown in FIG. 1A, the mount 120 may take the form of a strap or band that can be worn around a part of the body, such as a wrist, ankle, arm, leg, waist, and/or chest. In some examples, the device 100 may additionally or alternatively include an adhesive substrate for mounting the wearable device 100 to a body surface.

Figure 2A:
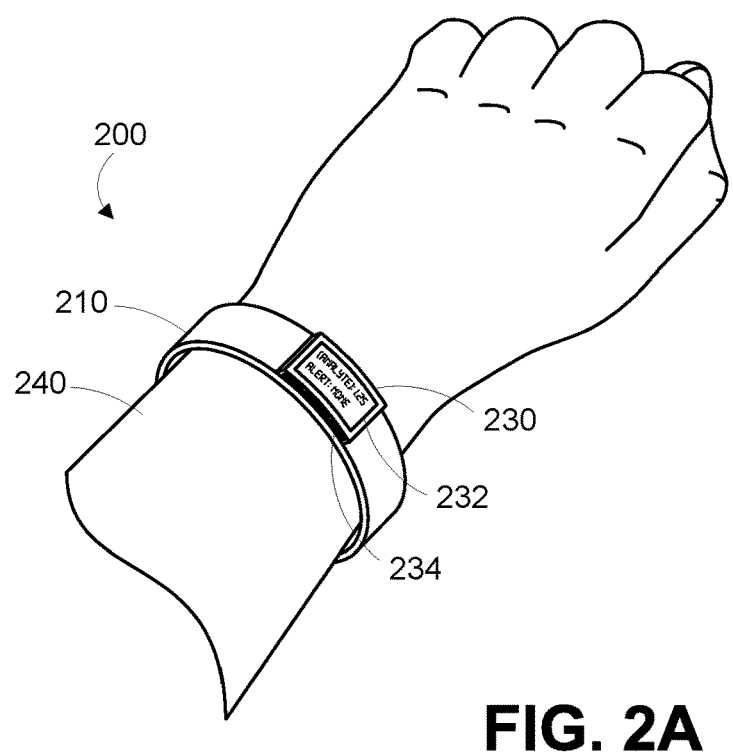
FIG. 2A is a top view of an example device worn on a wrist, according to an example embodiment.
Figure 2B:
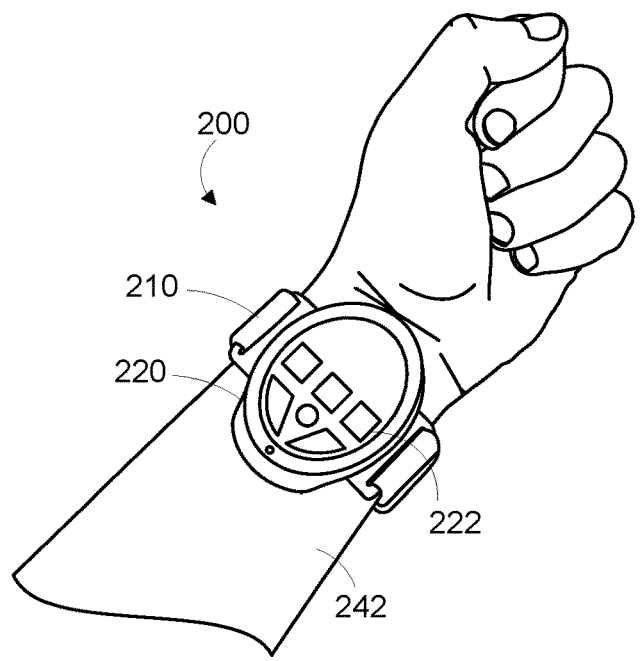
FIG. 2B is a reverse view of the example device shown in FIG. 2A when worn on a wrist, according to an example embodiment.

In some implementations, the body-mountable device 100 may be a wrist-mounted device. An example wrist-mounted device 200 is shown in FIGS. 2A and 2B. The wrist-mounted device 200 may be mounted to the wrist, similar to a watch or bracelet. FIG. 2A is a top view of the example wrist-mounted device 200 worn on a wrist. FIG. 2B is a reverse view of the example wrist-mounted device 200 shown in FIG. 2A. FIGS. 2A and 2B show opposing views of the wrist-mounted device 200 being worn on the wrist. FIG. 2A shows a perspective in which a posterior side 240 of the wrist is visible; FIG. 2B shows a perspective in which an anterior side 242 of the wrist is visible.

The wrist mounted device 200 can include a wristband 210, a sensor housing 220, and a user interface 230. As shown in FIGS. 2A and 2B, when the device 200 is mounted to the wrist, the sensor housing 220 can be positioned over the anterior side 242 of the wearer's wrist, and the user interface 230 can be positioned on the posterior side 240 of the wearer's wrist. The wearer of the device 200 may receive, via the user interface 230, one or more recommendations or alerts related to physiological measurements obtained using the wrist-mounted device 200. Such a configuration may be perceived as natural for the wearer of the device 200 in that it is common for the posterior side 240 of the wrist to be observed, such as during the act of checking a wrist-watch. Accordingly, the wearer may easily view a display 232 of the user interface 230. Further, the sensor housing 220 may be located on the anterior side 242 of the wearer's wrist where the subsurface vasculature or other elements of the wearer's body (e.g., carpal tunnel, ulnar artery, etc.) may be readily observable via physiological sensors mounted on and/or within the sensor housing 220. However, other implementations may have other configurations.

The display 232 may be configured to display a visual indication of an alert, recommendation, and/or an indication of the measured physiological parameters, for instance, the presence or concentrations of certain blood analytes being measured, a pulse rate, an oximetry measurement, etc. Further, the user interface 230 may include one or more buttons 234 for accepting inputs from the wearer. Additionally or alternatively, the sensor housing 220 may also include one or more buttons 222 for accepting inputs from the wearer. The user inputs may be used to adjust settings of the wearable device 200, such as user interface settings (e.g., the manner of displaying information on the display 232), aspects of the data collection system (e.g., measurement intervals, initiation of measurement, communication settings, other aspects related to the functioning of the device 200, and/or or indications of the wearer's current health state (e.g., normal, migraine, shortness of breath, heart attack, fever, "flu-like" symptoms, food poisoning, etc.).

D. Power System

The wearable device 100 additionally includes a power system for providing power to the electronics of the device 100. The device 100 may include various electronics configured to operate the sensor(s), user interface(s), communication system(s), and/or other electronic features described in connection with operation of the wearable device 100. The electronics may include, for example, a microprocessor that is configured to execute program instructions stored on a data storage situated within the device 100. In some examples, the wearable device 300 may include one or more circuit boards within the sensor housing 110, and various electronics could be disposed on the circuit board(s). Additionally, the device 100 can include an energy storage device, such as a rechargeable battery, which is electrically coupled to the circuit board and configured to provide power to the electronics. The power system of the device 100 can therefore include circuits configured to regulate and/or control charging of the battery, and to supply the remaining electronics with power using energy discharged from the battery. Charging the battery may involve providing energy to the device 100 via a conductive coil that receives time-variant magnetic flux from a wireless charging system to induce voltage across the coil. The voltage variations on the coil could be rectified and/or regulated and used to apply a charging current to the battery. Charging may also involve providing energy to the device 100 via a charging port with conductive terminals configured to receive a connector. Energy received at the conductive terminals could be used to apply a charging current to the battery.

Figure 3A:
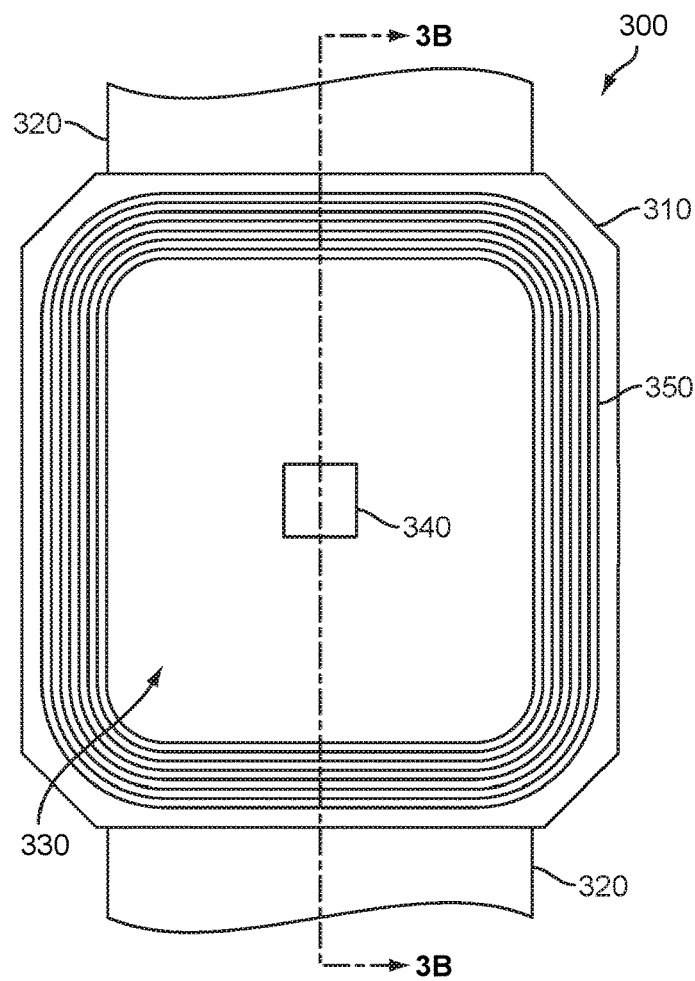
FIG. 3A is a schematic illustration of elements of an example wearable device, according to an example embodiment.
Figure 3B:
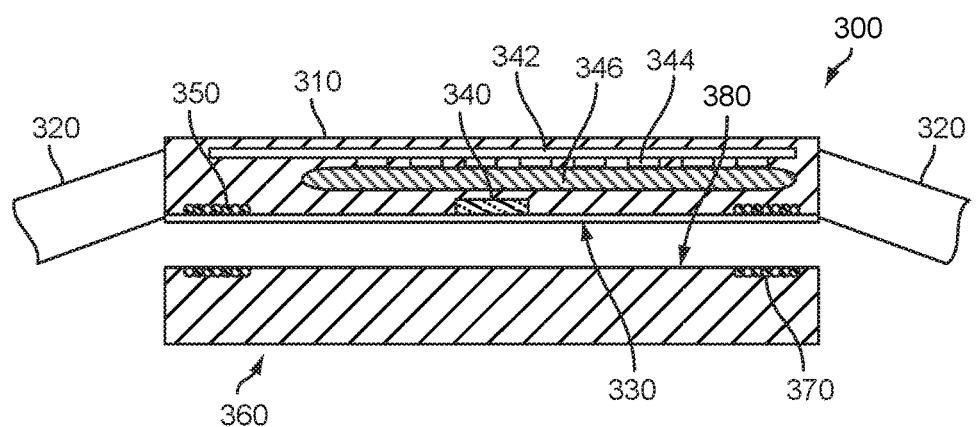
FIG. 3B is a cross-sectional schematic of the example wearable device illustrated in FIG. 3A mounted to an example wireless charger, according to an example embodiment.
Figure 3C:
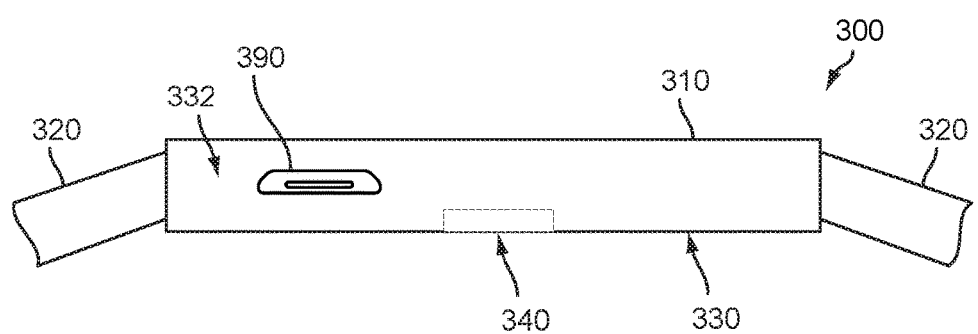
FIG. 3C is a side view of the example wearable device showing a charging port, according to an example embodiment.

An example wireless charging system is described in connection with FIGS. 3A and 3B, which illustrate a wearable device 300. The wearable device 300 includes a coil 350 configured to receive electromagnetic energy disposed within a housing 310 of the wearable device 300. FIG. 3B is a cross-sectional view of the wearable device 300 mounted on a wireless charger 360. FIG. 3C shows the example wearable device 300 with a charging port 390 for receiving a charging connector.

The wearable device 300 includes a housing 310 (e.g., a water-resistant and/or water-proof housing) configured to contain electronic components and to be mounted to an external body surface of a wearer by a mount 320 (e.g., a band). The mount 320 is a band configured to enclose a wrist of a human and to mount a contact surface 330 of the housing 310 in contact with the wrist of the wearer. A sensor 340 is disposed on a central portion of the contact surface and a coil 350 is disposed within the housing 310 proximate to the contact surface 330.

i. Electronics

The wearable device 300 can include electronics 344 disposed on a circuit board 342, which can be mounted within the housing 310. As used herein, the electronics 344 may be referred to herein as the load of the device 300. The electronics 344 could include a variety of different components configured in a variety of ways to enable applications of the wearable device. The electronics 344 could include controllers, amplifiers, switches, display drivers, touch sensors, wireless communications chipsets (e.g., Bluetooth radios or other radio transceivers and associated baseband circuitry to enable wireless communications between the wearable device 300 and some other system(s)), or other components. The electronics 344 include a controller configured to operate the sensor 340 (or multiple sensors) to detect one or more properties of the body of the wearer. The controller may also operate a communication system (e.g., an antenna structure for wireless communications) to generate and send an indication of detected properties and/or communicate information related to the detected properties via a user interface (e.g., a display) of the wearable device 300. In some examples, the controller can include a microprocessor configured to execute computer-readable instructions (e.g., program instructions stored in data storage of the wearable device 300) to enable operations of the wearable device 300.

In some examples, some electronics in the device 300 may be mounted on a flexible printed circuit board (PCB) and operative coupled to the circuit board 342. For example, the sensor 340 can be mounted on a flexible printed circuit board (PCB) that is mounted near the contact surface 330 such that the sensor 340 can be situated near the wearer when the device 300 is mounted to a wearer.

In addition, a microprocessor of the electronics 344 may be configured to perform a power-up reset operation upon the device 300 initially being powered (e.g., initially receiving energy via the power supply circuit that uses the battery 346 to provide power to the electronics 344). For instance, upon being powered up, the microprocessor may be configured to access and execute program instructions for an initiation sequence. The initiation sequence can involve loading and initiating a set of routines and/or operations and clearing or re-writing any memory buffers reserved for short term data storage during the performance of various operations. As a result, upon completion of the power-up reset operation, the device 300 can operate in a manner that is predominantly determined by information stored in data storage and associated with the initiation sequence. In particular, the device operation may be independent of a device state prior to the power-up reset. Moreover, to the extent that the device 300 was in an error state prior to the power-up reset operation, such as due to a memory buffer error, a communication system lag, or any other transient effect due to interactions between the various hardware and/or software subsystems of the device 300, the power-up reset operation may resolve the error state.

ii. Energy Storage Device

The wearable device 300 can include a rechargeable battery 346, which may be operatively coupled to the electronics 344. The rechargeable battery 346 can include one or more electrochemical cells which can be charged to store electrochemical energy by application of a charging current, or discharged to release stored electrochemical energy. The rechargeable battery 346 could include one or more of a variety of rechargeable battery chemistries, including lead-acid, nickel-metal-hydride, nickel-cadmium, lithium-ion, lithium-polymer, or some other rechargeable battery chemistry.

Further, the rechargeable battery 346 may be configured to be recharged multiple times using energy from a power source. The charging operation may be regulated and/or controlled with a charging circuit, and the discharging process may be regulated and/or controlled with a power supply circuit. The power supply circuit may be included in the electronics 344 and can be configured to use stored electrochemical energy of the rechargeable battery 346 to power the wearable device 300. The charging circuit may also be included in the electronics 344 and can be configured to recharge the rechargeable battery 346 multiple times using energy from a power source.

iii. Charging Circuit

The electronics 344 may additionally include a charging circuit that is configured to charge the rechargeable battery 346. The charging circuit may be configured to be powered by electromagnetic energy received by the coil 350 (i.e., the charging circuit can be configured to recharge the rechargeable battery 346 using energy received by the coil 350). Additionally or alternatively, the charging circuit may be configured to be powered by energy received through a charging port 390 (shown in FIG. 3C).

The charging circuit of the electronics 344 could be configured to recharge the rechargeable battery 346 by applying a constant current, a constant voltage, a trickle current, or some other electrical energy having one or more specified properties to two or more electrodes of the rechargeable battery 346. The rechargeable battery 346 could include one or more thermistors that the controller, the charging circuit, or some other component of the wearable device 300 could operate to determine a temperature of the rechargeable battery 346 and to prevent damage of the rechargeable battery 346 by reducing a charging rate, a discharging rate, or some other property of use of the rechargeable battery 346 to prevent damage of the rechargeable battery 346. Additional operations of the charging circuit are described, for example, in connection with FIGS. 4A-6.

iv. Power Supply Circuit

The electronics 344 may additionally include a power supply circuit that is configured to provide power to the electronics 344 using energy from the rechargeable battery 346. When providing power to the electronics 344 using energy from the rechargeable battery 346, the power supply circuit may be coupling the electronics 344 to a power supply path. In some examples, the power supply path may involve applying respective voltages to rails, which are in turn coupled to the electronics 344 of circuit board 342. The electronics 344 can then draw current through the supply rails to enable the electronics 344 to perform operations. The power supply circuit may also incorporate a discharge path that can be coupled to the electronics in response to receiving a control input. The discharge path may include a path to ground (or another reference voltage or current sink) that is connected to both power supply rails. So connected, residual voltages on internal capacitances of the electronics 344 can be discharged. The discharge path may be used, for example, prior to a power-on reset operation to prevent residual charges in the electronics 344 from interfering with the power-on reset operations.

In some examples, the power supply circuit may be an integrated circuit that is configured to receive a battery voltage at one pin and provide a power supply voltage at another pin, which may be coupled to the load. One example of an integrated circuit including a discharge path that is enabled in response to a control signal may be model number TPS62740, available from Texas Instruments. Additional operations of the power supply circuit are described, for example, in connection with FIGS. 4A-6.

v. Wireless Charging System

As shown in FIG. 3B, the wireless charger 360 includes a charging coil 370 configured to emit electromagnetic energy. The wearable device 300 can be mounted on (e.g., placed on, secured to, disposed in proximity to, aligned with) the wireless charger 360 such that a contact surface 330 of the wearable device 300 is in contact with a charging surface 380 of the wireless charger 360. The coil 350 includes conductive windings that outline the central portion of the contact surface 330 such that the central portion of the contact surface 330 is proximate to the interior of the coil 350. In some examples, the coil 350 may be disposed on a magnetic shield and electrically coupled to a flexible PCB. The flexible PCB may then be electrically coupled to the circuit board 342 (e.g., via flexible interconnect that passes through a slot in the magnetic shield). Other arrangements for electrically coupling the sensor 340, coil 350, and electronics 344 are also possible. The wireless charger 360 can provide power to the wearable device 300 by inducing a time-varying voltage across the coil 350, which can be rectified and regulated within the wearable device 300. Energy received using the coil 350 could be used to power the wearable device 300 and/or to recharge the rechargeable battery 346.

In some examples, the wearable device 300 and/or wireless charger 360 could be configured to facilitate efficient transfer of electromagnetic energy between the charging coil 370 of the wireless charger 360 and the coil 350 of the wearable device 300 by aligning, ensuring proximity of, or effecting some other specified relative arrangement between the coil 350 and the charging coil 370. For example, the wearable device 300 and/or wireless charger 360 could be configured to ensure alignment between the coil 350 and charging coil 370, e.g., by the contact surface 330 and the charging surface 380 having matching and/or interlocking shapes, by including one or more permanent magnets configured to exert aligning magnetic forces between the wearable device 300 and the wireless charger 360, by including alignment markings to indicate to a user a proper alignment of the wearable device 300 on the wireless charger 360, or by the addition of some other components.

Further, the wearable device 300 and/or wireless charger 360 could include one or more magnetic shims or other materials having one or more specified magnetic properties to modify the transfer of electromagnetic energy between the coil 350 and the charging coil 370. For example, the wearable device 300 could include a magnetic shield disposed proximate to the coil 350 on a side of the coil 350 opposite the contact surface 330. The magnetic shield could be configured to direct electromagnetic energy to be transferred to the coil 350. The magnetic shield could additionally or alternatively be configured to shield components of the wearable device 300 from electromagnetic energy (e.g., to prevent electromagnetic energy directed toward the wearable device 300 from heating or otherwise affecting components (e.g., electronics, rechargeable batteries) opposite the magnetic shield from the direction of the electromagnetic energy). For instance, the magnetic shield could include materials having a specified high permeability such that the magnetic shield could redirect magnetic flux to reduce heating of the electronics 344 and/or rechargeable battery 346 due to electromagnetic energy directed toward the coil 350 and/or to increase the efficiency of energy transfer to the coil 350 from electromagnetic energy directed toward the coil 350 by the charging coil 370. The magnetic shield could include materials having a specified low electrical conductivity such that the magnetic shield is minimally heated by exposure to time-varying electromagnetic fields (e.g., the magnetic shield could experience minimal eddy currents when exposed to time-varying magnetic fields).

The coil 350 can be configured in a number of ways to enable efficient reception of electromagnetic energy or to enable and/or facilitate a number of other applications. The windings of the coil 350 could be disposed proximate to a peripheral portion of the contact surface 330 of the housing 310 such that an area enclosed by the coil 350 (e.g., the central portion of the contact surface 330 of the housing 310) is maximized and/or such that a separation distance between the coil 350 and the charging coil 370 is minimized. The coil could have a rectangular shape, an elliptical shape, or some other shape according to an application; for example, the shape of the coil 350 could correspond to the shape of the contact surface 330. The coil 350, charger 360, or other components could be configured to enable efficient reception of electromagnetic energy of a specific frequency (e.g., 100 kilohertz to 200 kilohertz) by the coil 350. For example, the coil 350 and a capacitor of the charger 360 could be configured to have a resonant frequency equal to the specific frequency of the electromagnetic energy.

The wireless charger 360 could be configured in a variety of ways and include a variety of additional components to facilitate the emission of electromagnetic energy such that the coil 350 of the wearable device 300 can receive the transmitted electromagnetic energy. The wireless charger could include switches, coils, capacitors, variable frequency drives, or other electronics configured to emit electromagnetic energy that could be received by the coil 350 of the wearable device 300. In some examples, the wireless charger 360 could be configured to detect the presence, energy capacity, or other properties of the wearable device 300 and to emit electromagnetic energy having one or more properties related to the detected presence, energy capacity, or other property. In some examples, the wireless charger 360 could receive information from the wearable device 300 indicating an amount of electromagnetic energy to emit toward the coil 350 of the wearable device 300. For example, the wearable device 300 could operate the coil 350 to change the impedance or some other electromagnetically detectable property of the coil 350 in a pattern related to an amount of energy that the wireless charger 360 could emit toward the coil 350 of the wearable device 300 using the charging coil 370. In some examples, the wireless charger 360 and/or wearable device 300 could comply with one or more wireless charging standards (e.g., the Qi wireless charging standard).

vi. Charging Port

FIG. 3C is a side view of the example wearable device 300. The wearable device 300 includes a charging port 390 situated along a sidewall 332 of the housing 310. The charging port 390 may be mechanically coupled to the housing 310 so as to provide a water-resistant and/or waterproof seal between the housing sidewall 332 and the port 390 (e.g., using adhesives and/or sealants to prevent moisture from entering an interior volume of the housing 310). The charging port 390 may be situated at other locations of the housing 310.

The charging port 390 may include conductive terminals within a cavity that is configured to receive a mating electrical connector that, when received within the cavity, electrically couples with conductive terminals of the port 390. The conductive terminals of the port 390 can then be operatively connected to the electronics 344 disposed on the circuit board 342 within the device 300. The charging port 390 may be configured so as to receive connectors with one or more conductive terminals configured according to various standards (e.g., universal serial bus (USB) connectors, micro USB connectors, mini USB connectors, other multi-pin connectors, etc.). While connected, conductive terminals within the charging port 390 can receive energy from a power source (e.g., a charging current). The charging circuit within the device 390 can then use the energy received via the charging port 390 to apply a charging current to the rechargeable battery 346 within the device 300.

In some implementations, the wearable device 300 may include both the coil 350 for wireless charging and the charging port 390 for coupling with an electrical connector. In other implementations, the wearable device 300 may include only one of the coil 350 and the charging port 390.

III. Charger Initiated Power Cycle Reset

FIGS. 4A, 4B, 5A, and 5B illustrates example systems for performing a power-on reset in response to a change in power applied to the charging system from a power source.

A. Example Control Circuits

Figure 4A:
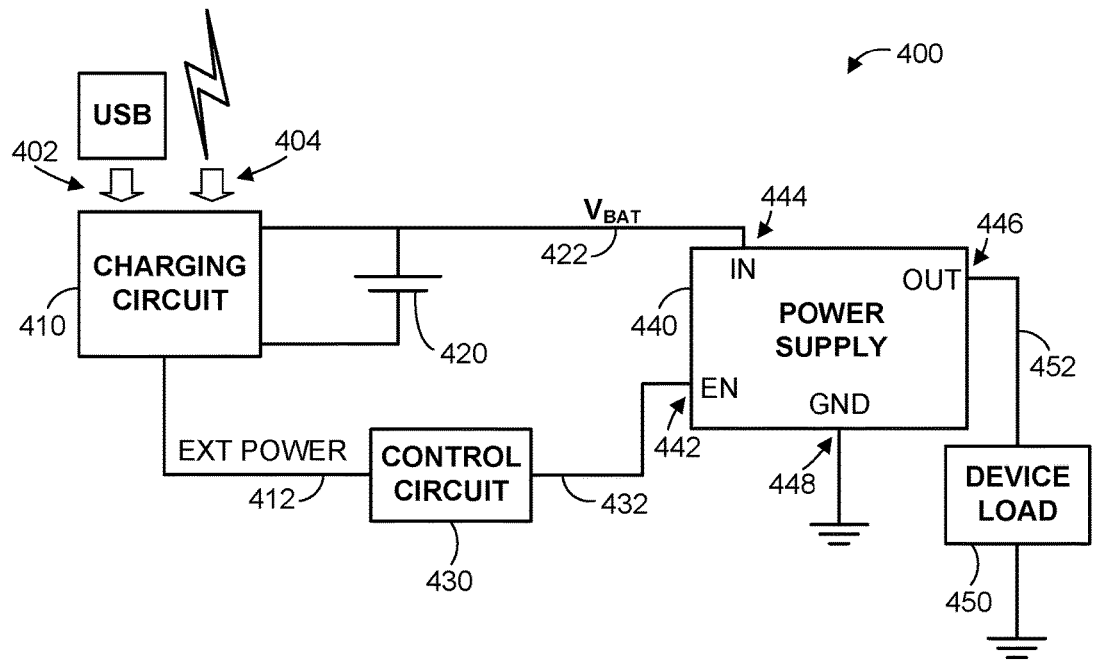
FIG. 4A is a block diagram of an example system for performing a power cycle reset, according to an example embodiment.
Figure 4B:
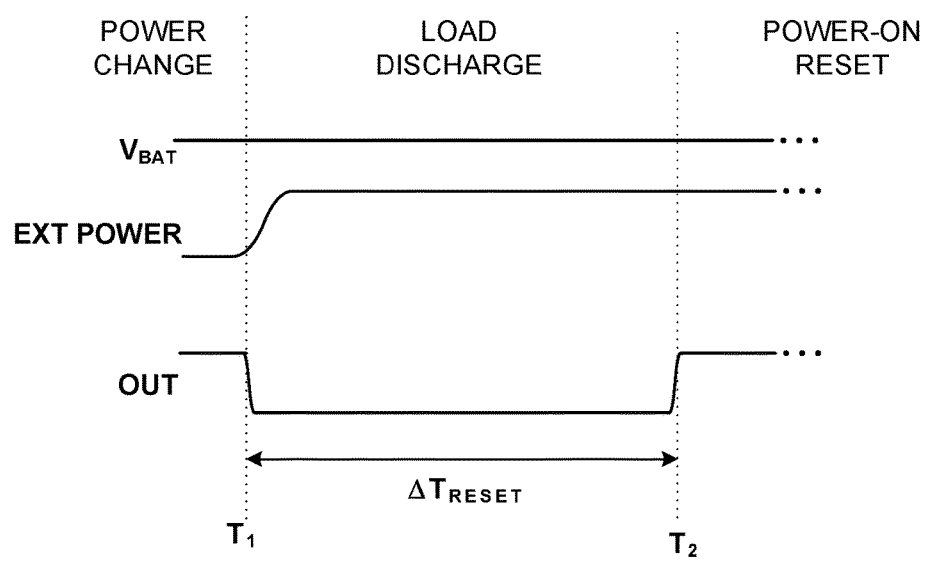
FIG. 4B is a timing diagram illustrating an example operation during a power cycle reset, according to an example embodiment.

FIG. 4A is a block diagram of an example system 400 for performing a power cycle reset. FIG. 4B is a timing diagram illustrating an example operation during a power cycle reset. The system 400 includes a charging circuit 410, an energy storage device 420, a control circuit 430, a power supply circuit 440, and a load 450. The charging circuit 410, energy storage device 420, control circuit 430, power supply circuitry 440, and load 450 can be operative connected via interconnects as shown (e.g., the 412, 422, 432, 452), each of which may be conductive interconnects, traces, etc., that communicatively couple components of system 400 to enable operations described herein. The system 400 may be implemented in a power system of a wearable device, such as any of the wearable devices 100, 200, 300 described above.

The charging circuit 410 is coupled to the energy storage device 420 and is configured to receive energy from a wireless charger (404) or a conductive connector (402) and use the received energy to charge the energy storage device 420 (e.g., by applying a charging current). The energy storage device 420 may be a rechargeable battery similar to the rechargeable battery 346 described above in connection with FIGS. 3A-3C, and the charging circuit 410 may regulate the charging current based on feedback from the rechargeable battery so as to prevent damage to the rechargeable battery.

The charging circuit 410 is also coupled to the control circuit 430 via connection 412. The charging circuit 410 can be configured to use the connection 412 to convey an indication of the power applied to the charging circuit 410. For example, the connection 412 may be set to a first voltage while power is applied to the charging circuit 410 from one or more external power sources (e.g., 402, 404), and is set to a second voltage while power is not applied to the charging circuit 410. Thus, a change in voltage on the connection 412 can indicate a change in power applied to the charging circuit 410. For example, in FIGS. 4A and 4B, the connection 412 is labeled by "EXT POWER," and is set to a low voltage when power is applied to the charging circuit 410 and a high voltage when power is not applied to the charging circuit 410. Other examples are also possible in which a change in voltage (or another indicator) can be conveyed from the charging circuit 410 to the control circuit 430 via the connection 412 to indicate a change in the power applied to the charging circuit 410.

The control circuit 430 includes one or more switches, capacitors, resistors, amplifiers, comparators, and/or other components arranged to generate a control signal in response to receiving the indication (via connection 412) of a change in power applied to the charging circuit 410. Once generated, the control signal can then be applied to the power supply circuit 440 via connection 432, which can cause the power supply circuit 440 to couple the load 450 to a discharge path. The control signal may be, for example, a voltage within a predetermined range of voltages that cause the power supply circuit 440 to discharge the load. For instance, the control signal may be a voltage above or below a particular threshold voltage.

The control circuit 430 can be implemented in various different ways to generate the control signal. In some cases, the control circuit 430 includes a transistor which is temporarily turned on (i.e., set to a conductive state) in response to voltage on the connection 412 transitioning from a first voltage to a second voltage. The control circuit 430 can be configured to apply the control signal to the power supply circuit 440 for a period of time that is sufficient to cause the power supply circuit 440 to substantially discharge the load 450. In some examples, the control circuit 430 includes at least one capacitor and the duration for which the control signal is applied to the power supply circuit 440 may be dependent, at least in part, on the capacitance of the capacitor. For example, the control circuit 430 may also include a capacitor which charges or discharges following the transistor turning on until the transistor is turned off (i.e., set to a non-conductive state). Moreover, once the transistor is turned off, a voltage across the transistor may become charged based on a capacitance of one or more additional capacitors, and the charging duration may be based on the capacitance of such capacitor(s). Thus, the duration for which the control signal is applied to the power supply circuit 440 can be set in accordance with one or more capacitance values.

The power supply circuit 440 can include multiple inputs and outputs. In FIG. 4A, the schematic representation of the power supply circuit 440 includes a control input 442, which is labeled "EN," a battery input 444, which is labeled "IN," a power supply output 446, which is labeled "OUT," and a ground connection 448, which is labeled "GND." The control circuit 430 can be coupled to the control input 442 via connection 432. In particular, the control circuit 430 can be configured to provide the control signal to the control input 442 via the connection 432. The battery 420 can be coupled to the battery input 444 via connection 422. The battery input 444 can receive a battery voltage ("$V_{BAT}$") from the battery 420. In operation, the power supply circuit 440 can use energy from the energy storage device 420, received at battery input 444, to power the load 450 via the power supply output 446 and connection 452. For example, when providing power to the load 450, the power supply circuit 440 may couple the power supply output 446 to a power supply path, which may include the battery input 444. The power supply circuit 440 can also be configured to couple the load 450 to a discharge path so as to discharge the load 450. For instance, the power supply circuit 450 may include one or more components that cause the power supply output 446 to be coupled to a discharge path (e.g., a path including the ground connection 448) in response to a control signal applied to the control input 442.

In some examples, a power cycle reset operation may involve three phases. First, the power applied to the power circuit 410 can be changed at time $T_1$. Second, during a period of time with duration $\Delta T_{RESET}$ that spans approximately from time $T_1$ to time $T_2$, the control circuit 430 can apply the control signal to the power supply circuit 440, which causes the power supply circuit 440 to couple the load 450 to the discharge path. Third, at time $T_2$, the control circuit 430 can cease applying the control signal to the power supply circuit 440, which causes the power supply circuit 440 to couple the load 450 to the power supply path, which causes a microprocessor in the load 450 to initiate a power-on reset.

For example, the power change phase may involve the external power (e.g., 402, 404) being disconnected from a wearable device that includes the system 400. Disconnecting the wearable device from the power source may involve, for example, unplugging an electrical connector from a charging port, which causes the charging circuit to stop receiving power 402. Additionally or alternatively, disconnecting may involve removing the wearable device from a wireless charger, which causes the charging circuit 410 to stop receiving power 404. The change in applied power to the charging circuit 410 causes the voltage on EXT POWER to transition from a first voltage to a low voltage (e.g., from a low voltage to a high voltage). The change in voltage is applied to the control circuit 430 via connection 412, which causes the control circuit 410 to apply the control signal to the control input 442 of the power supply circuit 440 via connection 432.

The control circuit 430 is configured to apply the control signal to the power supply circuit 440 for the period of time $\Delta T_{RESET}$. For example, the control signal may be a voltage below a threshold and the control circuit 430 may set the voltage of the connection 432 to be below the threshold for at least the duration $\Delta T_{RESET}$. In some examples, the period of time $\Delta T_{RESET}$ may be about 100 microseconds. Generation of the control signal by the control circuit 430 may be initiated by a switch being turned on in response to the voltage change on connection 412 at time $T_1$, and the duration of $\Delta T_{RESET}$ may be based, at least in part, by capacitance(s) of capacitor(s) included in the control circuit 430. While the control signal is applied to the control input 442, the power supply circuit 440 couples the load 450 to the discharge path, which discharges the load 450 (e.g., by draining voltage on internal capacitances of electronics in the load 450).

The control circuit 430 is configured to cease applying the control signal after expiration of the period of time $\Delta T_{RESET}$. For example, the control circuit may be configured such that the voltage applied to the control input 442 via connection 432 exceeds a threshold after time $T_2$. Upon ceasing application of the control signal to the control input 442, the power supply circuit 440 couples the load 450 to the power supply path, which supplies power to the load 450 using the energy storage device 420. Providing power to the load 450 following the discharge during the period of time $\Delta T_{RESET}$ causes a microprocessor in the load 450 to perform a power-up reset.

Figure 5A:
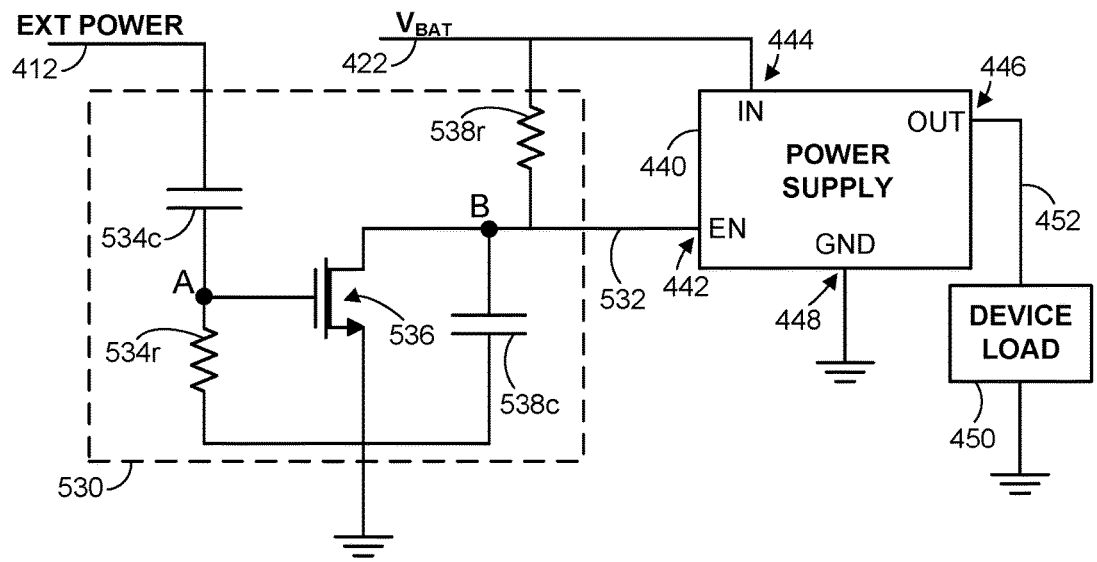
FIG. 5A is a block diagram of an example system for performing a power cycle reset, according to an example embodiment.
Figure 5B:
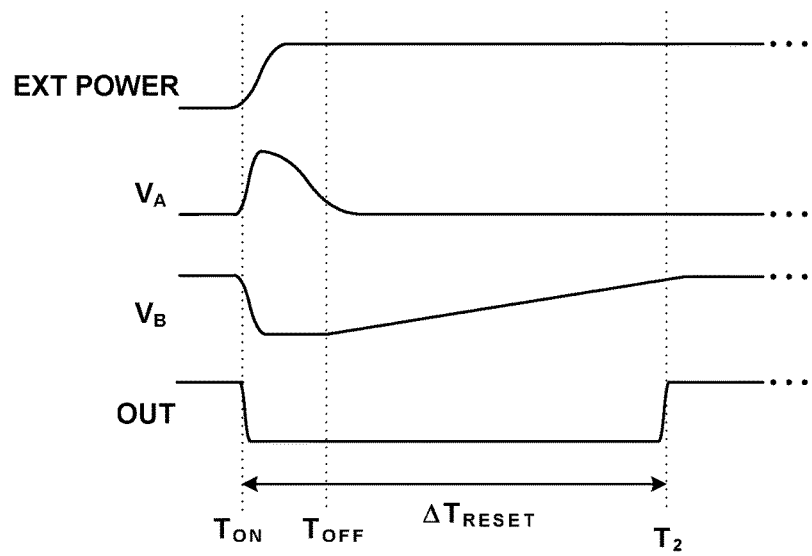
FIG. 5B is a timing diagram illustrating an example operation during a power cycle reset, according to an example embodiment.

FIG. 5A is a block diagram of an example system 500 for performing a power cycle reset. FIG. 5B is a timing diagram illustrating an example operation during a power cycle reset. The system 500 includes a control circuit 530, the power supply circuit 440, and the load 450. The control circuit 530 can receive the indication of a change in power applied to the charging circuit 410 via connection 412, and output a control signal to the power supply circuit 440 via connection 532. The control circuit 530 is thus one example implementation of the control circuit 430 described above.

The control circuit 530 includes a first capacitor 534c, a first resistor 534r, a transistor 536, a second resistor 538r, and a second capacitor 538c. The transistor can be a field effect transistor with a gate terminal that controls the conductance state between first and second terminals of the transistor (e.g., voltage applied to the gate terminal may determine a conductance of a channel region). The first capacitor 534c is coupled between the first resistor 534r and the connection 412 from the charging circuit 410 (i.e., EXT POWER). The first capacitor 534c and the first resistor 534r are coupled together at node A, which is also coupled to the gate terminal of the transistor 536. On the side opposite node A, the first resistor 534r is coupled to the second terminal of the transistor, which may be coupled to ground or another reference voltage. Thus, the first resistor 534r is coupled between the gate terminal and the second terminal of the transistor 536.

The second resistor 538r is coupled between the second capacitor 538c and the connection 422 from the battery 420 (i.e., $V_{BAT}$). The second resistor 538r and the second capacitor 538c are coupled together at node B, which is also coupled to the first terminal of the transistor 536. On the opposite side of node B, the second capacitor 538c is coupled to the second terminal of transistor 536, which may be coupled to ground or another reference voltage. Thus, the second capacitor 538c is coupled between the first terminal and the second terminal of the transistor 536. The first terminal of the transistor 536 is also coupled to the output connection 532 of the control circuit 530.

The first capacitor 534c and first resistor 534r control the duration for which the transistor 536 is turned on (i.e., becomes conductive) in response to a voltage transition on EXT POWER. For instance, as shown in FIG. 5B, an increase in the EXT POWER voltage appears as a voltage at node A that turns on the transistor 536 at time $T_{ON}$. The voltage at node A then decreases as first capacitor 534c charges up through the first resistor 534r until the voltage between the gate terminal and the second terminal is below a threshold and the transistor 536 turns off, at time $T_{OFF}$. Thus, the duration that the transistor 536 is turned, from $T_{ON}$ to $T_{OFF}$, can be based on an RC time constant of the first capacitor 534c and first resistor 534r.

When the transistor 536 is turned on, the voltage of node B is set to ground and the second capacitor 538c is discharged through the transistor 536. Setting node B to ground can cause the voltage applied to the control input 442 to drop below a threshold value, which initiates the discharge of the load 450 by the power supply circuit 440. Once the transistor 536 is turned off, at time $T_{OFF}$, the duration for which the voltage applied to the control input 442 remains below the control signal threshold is controlled by the second resistor 538r and the second capacitor 538c. After the transistor 536 turns off, the second capacitor 538c is recharged through the second resistor 538r, until the voltage at node B ceases to be below the control signal threshold, at time $T_2$, which causes the power supply circuit 440 to couple the load to the power supply path. The period of time $\Delta T_{RESET}$ during which the load 450 is discharged by the power supply circuit 440 therefore includes a first portion, between times $T_{ON}$ and $T_{OFF}$, during which the transistor 536 is turned on, and node B is set to ground, and a second portion, between times $T_{OFF}$ and $T_2$, during which the transistor 536 is turned off, and node B is recharged through the second resistor 538r. The duration of the first portion, from $T_{ON}$ and $T_{OFF}$, is controlled at least in part by the capacitance of the first capacitor 534c and resistance of the first resistor 534r. The duration of the second part, from $T_{OFF}$ to $T_2$, is controlled at least in part by the capacitance of the second capacitor 538c and resistance of the second resistor 538r.

The control circuit 530 is configured to initiate application of the control signal (e.g., by turning on the transistor 536 at time $T_{ON}$) only in response to the voltage on EXT POWER transitioning from low to high, which indicates disconnection of an external power supply to the charging circuit 410. As a result, each time a wearable device including the control circuit 530 is disconnected from a charging power source (e.g., unplugged or removed form a wireless charger), the device undergoes a power-up reset. In some examples, however, a control circuit may be configured to initiate application of the control signal in response to EXT POWER transitioning from high to low voltage. For instance, the transistor 536 may be modified from an n-type to a p-type transistor, and the resistor 534r can be coupled to a reference voltage that pulls up the gate voltage until the transistor turns off. Many other examples are possible.

Other control circuits including one or more transistors, capacitors, and/or resistors are also possible. In some cases, other transistors may be used, including n-type or p-type, bi-polar junction transistors, field-effect transistors, or other types of transistors. Utilizing a different transistor may involve modifying one or more other aspects of the control circuit to provide similar functionality, such as providing a resistor to pull up a gate terminal, rather than pull down, after the transistor is turned on. Moreover, in some examples, a switch having a conductance controlled by the voltage at node A may be used instead of, or in addition to, a transistor.

B. Example Operations

Figure 6:
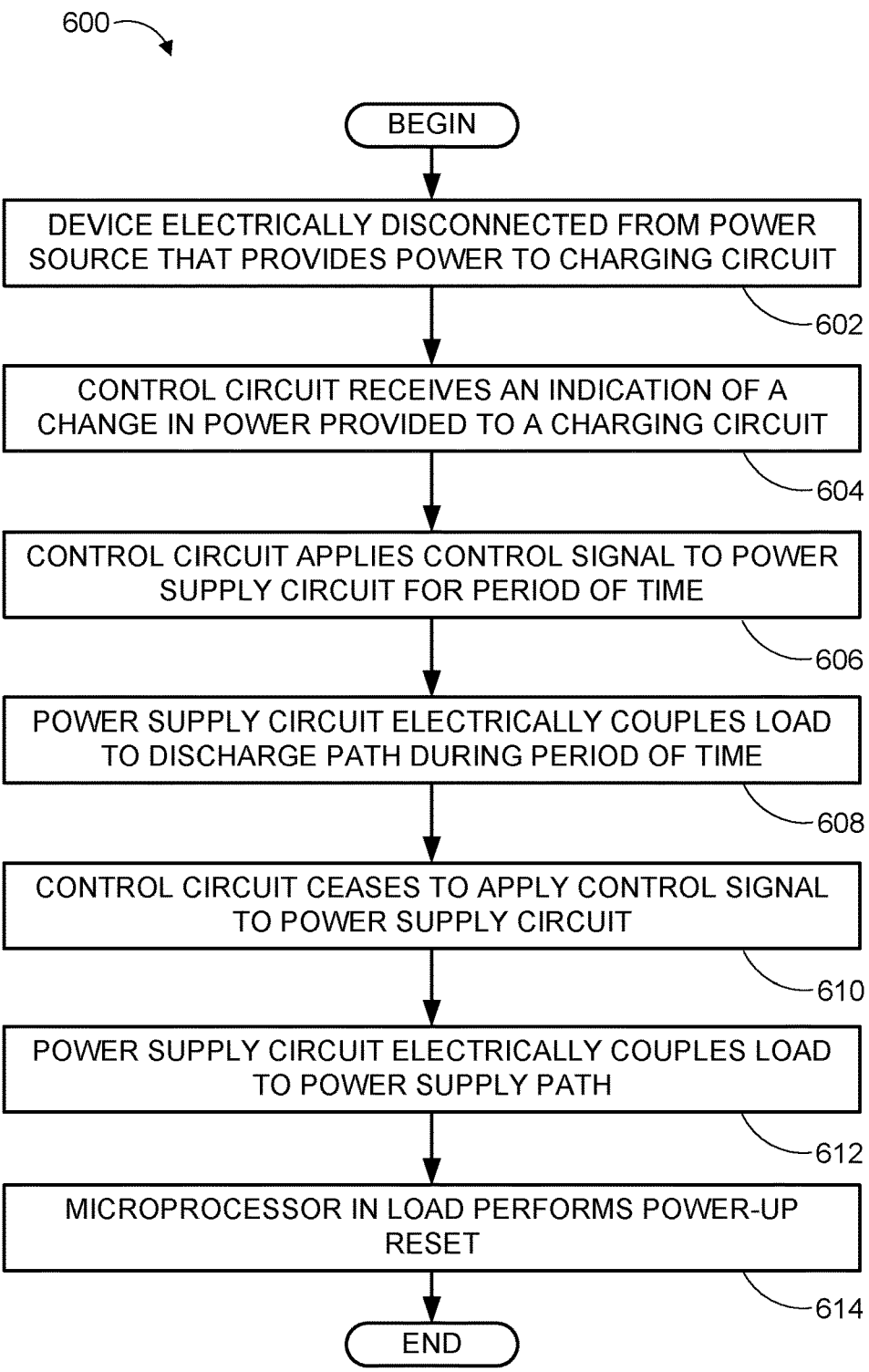
FIG. 6 is a flow chart of an example process, according to an example embodiment.

FIG. 6 is a flow chart of an example process 600. The example process 600 may be performed by either of the power systems 400, 500 of FIGS. 4A-5B, which may be included in a wearable devices, such as any of the devices 100, 200, 300 of FIGS. 1A-3C.

At block 602, a wearable device can be disconnected form an external power source that provides power to a charging circuit for charging a rechargeable battery of the device. For example, an electrical connector may be unplugged from a charging port on the wearable device. As a result, voltage ceases being applied to the charging circuit from terminals of the charging port. Alternatively, the wearable device may be removed from a wireless charger (e.g., the wearable device can be detached from, or moved away from, a surface of the wireless charger that radiates electromagnetic energy). As a result, voltage fluctuations that are induced on a coil within the wearable device during charging cease to be induced, and voltage ceases being applied to the charging circuit. The charging circuit can be configured to generate an indicator, such as an output voltage, that indicates whether an external power source is currently applying power to the charging circuit. Thus, upon disconnection from the power source, the charging circuit can generate an indication of the disconnection (e.g., by the output voltage transitioning from a first voltage to a second voltage).

At block 604, a control circuit can receive an indication of a change in power provided to the charging circuit. For example, the control circuit can be coupled to the charging circuit to receive the output voltage from the charging circuit that indicates whether an external power source is currently applying power to the charging circuit, such as the charging circuit 430 coupled to the charging circuit 410 via the connection 412. The output voltage can change from a first voltage to a second voltage, and the rising (or falling) voltage can thus indicate, at the control circuit, a change in power being applied to the charging circuit.

At block 606, the control circuit applies a control signal to a power supply circuit for a period of time. The power supply circuit may be connected to the battery, the control circuit, and a load, such as the power supply circuit 440 that is coupled to the battery 420 via connection 422, the control circuit 430 via connection 432, and the load 450 via connection 452. The power supply circuit may be configured to selectively couple the load to a power supply path, in which the load is powered using energy from the battery, and a discharge path, in which the load is discharged. While the control signal is applied, the power supply circuit can couple the load to the discharge path, at block 608, which causes the load to discharge during the period of time that the control signal is applied to the power supply circuit. The control signal may be, for example, a voltage within a predetermined range of voltages (e.g., above or below a threshold voltage) that, when applied at a control input of the power supply circuit, causes the power supply circuit to couple the load to the discharge path. As noted above in connection with FIGS. 4A-5B, the duration of the period of time may be controlled, at least in part, by capacitance(s) of capacitor(s) in the control circuit. The duration of the period of time may therefore be set to a period that is sufficiently long to provide a full discharge of electronics in the wearable device. In some examples, the period of time may be about 100 microseconds, for example. Depending on implementations, the period of time may also range between about 2 microseconds and about 300 microseconds.

At block 610, the control circuit can cease to apply the control signal to the power supply circuit. The control circuit ceasing to apply the control signal may involve, for example, the control circuit ceasing to apply a voltage to the control circuit that is within a predetermined range of voltages. The control circuit can be configured such that the control signal only ceases to be applied following the period of time (e.g., by selection of capacitance values). Upon the control circuit ceasing to apply the control signal to the power supply circuit, the power supply circuit can couple the load to the power supply path, at block 612, which causes the load to receive power after having been discharged (in block 608). For example, the power supply circuit may be configured such that while the control circuit is being applied to a control input thereof, a discharge circuit is enabled to couple one or more power supply rails to a ground voltage (or other discharge voltage). Further, once the control signal is no longer applied, the discharge circuit may no longer be enabled, and the power supply rails can be coupled to power supply voltage(s), such as a voltage from the battery. Thus, the power supply circuit can be configured to provide power to the load in response to the control circuit ceasing application of the control signal.

At block 614, a microprocessor within the load can perform a power-up reset operation. The power-up reset may involve, for example, the microprocessor accessing and executing program instructions for an initiation sequence during which processes and operations of the wearable device are initiated. A variety of operations may be performed during the power-up reset, such as calibration of the communication systems and/or sensors, allocation of memory, and/or other operations.

IV. Alternative Power Cycle Reset Examples

Figure 7:
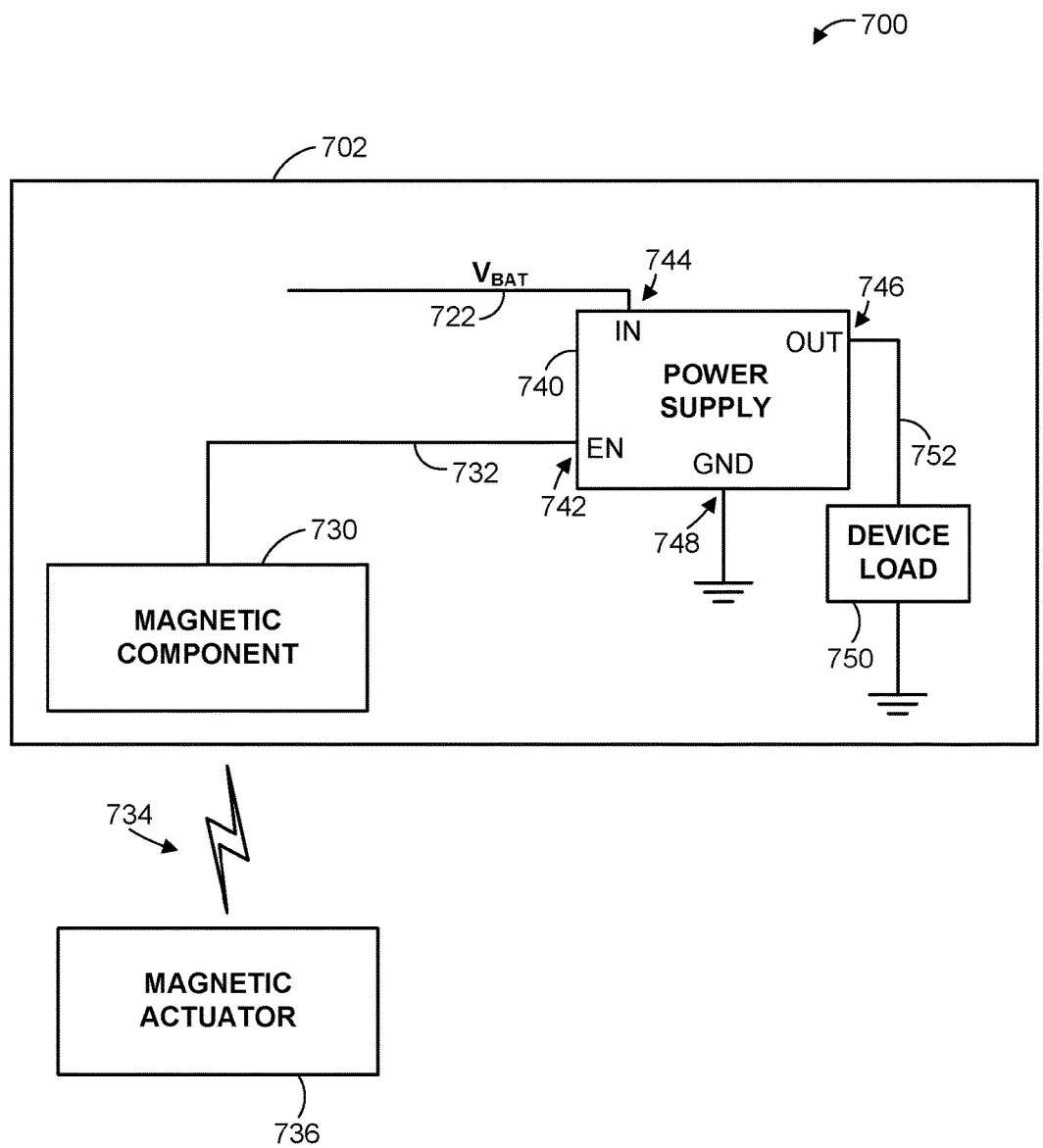
FIG. 7 is a block diagram of another system for performing a power cycle reset, according to an example embodiment.

FIG. 7 is a functional block diagram of another system 700 for performing a power cycle reset. The system 700 includes a wearable device 702 and a magnetic actuator 736. Electronics in the wearable device 700 include a load 750 and a power supply circuit 740. The power supply circuit 740 can be similar to the power supply circuit 440 described above in connection with FIGS. 4A-5B. As shown in FIG. 7, the power supply circuit 740 includes a battery input 744 coupled to a battery voltage $V_{BAT}$ via connection 722, power supply output 746 coupled to the load 750 via connection 752, a ground connection 748, and a control input 742. The control input 742 can be connected to a magnetic component 730 via connection 732. The power supply circuit 740 can be configured to selectively couple the load 750 to a power supply path in which the load 750 is powered using energy from the battery and a discharge path in which the load 750 is discharged. The power supply circuit 740 can couple the load 750 to the discharge path while a control signal is received at the control input 742. The magnetic component 730 can be operated to apply the control signal via connection 732. For example, the magnetic component 730 may apply the control signal when subjected to an external magnetic field 734 from the magnetic actuator 736.

The magnetic component 730 may include a device configured to generate an electrical and/or mechanical effect in response to application of the magnetic field 734 from the magnetic actuator 736. For example, the magnetic component 730 may include an arrangement in which contacts are brought together or separated depending on an applied magnetic field (e.g., a Reed switch). The magnetic component 730 may additionally or alternatively include a (e.g., or a device that varies an output voltage based on the applied magnetic field 734 (e.g., a Hall effect sensor or device).

The magnetically actuated power cycle reset system 700 described in connection with FIG. 7 thus enables a wearable device to perform a power-on reset that is entirely mediated by wireless signals (i.e., the magnetic field 734). Like the wireless charging system described above, the system 700 may therefore be suitable for applications in which the wearable device 702 is entirely sealed and includes no ports for mechanical inputs or the like or for removal of the battery from the device 702.

Other examples are also possible in which a power-on reset operation can be performed in response to a trigger. For example, various light-sensitive sensors, motion-sensitive sensors, and/or magnetic-field-sensitive sensors may be configured to monitor sensor data for an indication of a predetermined reset cue. Once detected, (e.g., via a routine performed intermittently by a processor within the device), a control signal can be provided to the power supply circuit. Additionally or alternatively, some examples may include a background routine that intermittently performs a series of checks and/or diagnostics. Upon detection of a failure of a check or diagnostic reading indicating that the device is in an error state, the routine may initiate a power cycle reset by causing a control signal to be provided to the power supply circuit.

IV. Example Wearable Device

Figure 8:
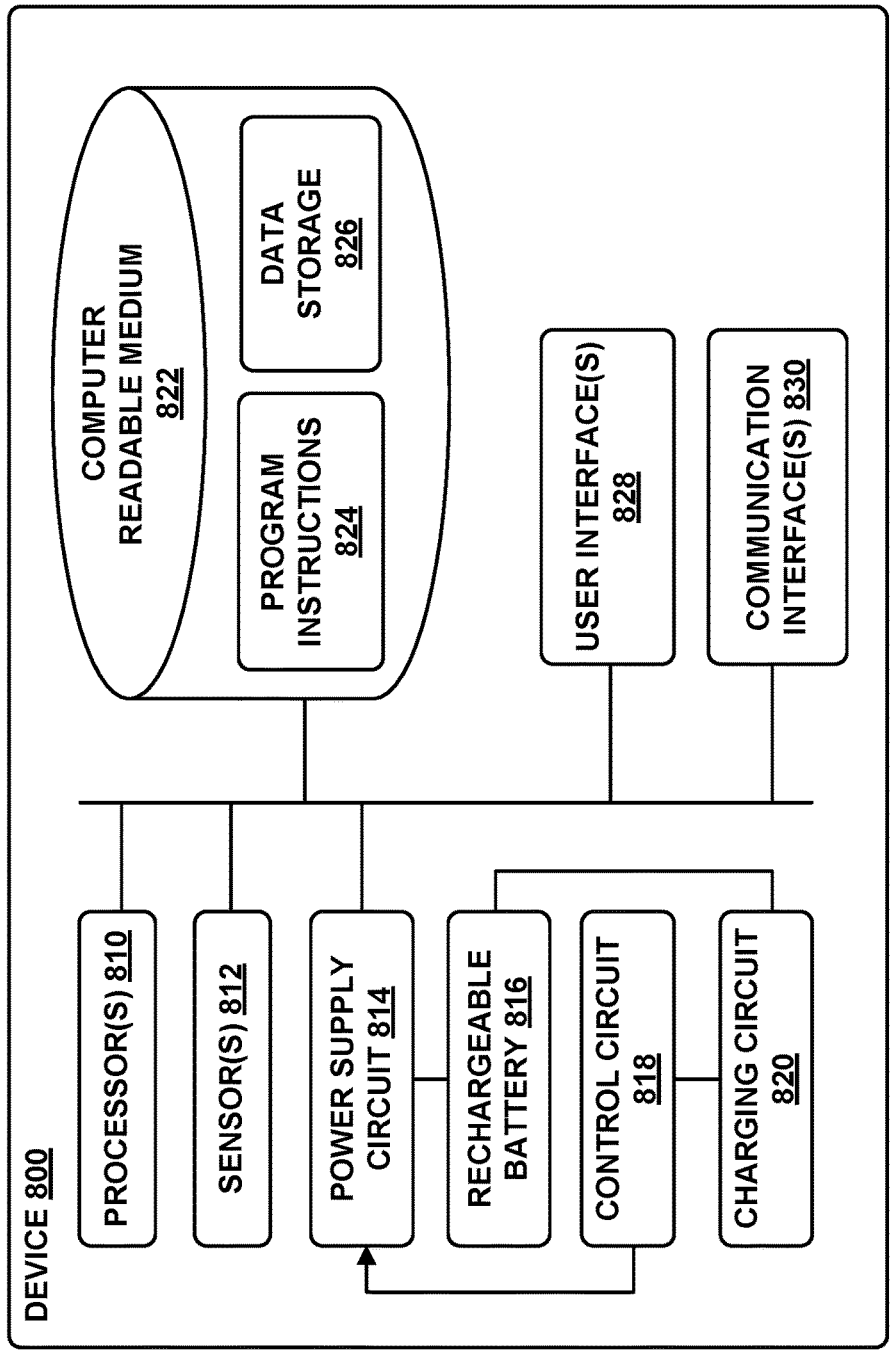
FIG. 8 is a functional block diagram of an example wearable device, according to an example embodiment.

FIG. 8 is a functional block diagram of an example wearable device 800. The Device 800 may take the form of or be similar to one of the wearable devices and/or systems described in connection with FIGS. 1-7. Device 800 may also take other forms, such as an ankle, waist, or chest-mounted device. Device 800 could also take the form of a device that is not configured to be mounted to a body. For example, device 800 could take the form of a handheld device configured to be maintained in proximity to an environment of interest (e.g., a body part, a biological sample container, a volume of a water treatment system) by a user or operator of the device 800 or by a frame or other supporting structure. Device 800 also could take other forms.

In particular, FIG. 8 shows an example of a device 800 having a processor 810, a sensor 812, a power supply circuit 814, a rechargeable battery 816, a control circuit 818, a charging circuit 820, a computer readable medium 822, a user interface 828, and a communication interface 830 for transmitting data to a remote system. The components of the device 800 may be disposed on a mount or on some other structure for mounting the device to enable stable detection of one or more properties of an environment of interest (e.g., of a body of a wearer of the device 800), for example, to an external body surface where a portion of subsurface vasculature or other physiological feature is observable.

Processor 810 may be a general-purpose processor or a special purpose processor (e.g., digital signal processors, application specific integrated circuits, etc.). The one or more processors 810 can be configured to execute computer-readable program instructions 824 that are stored in the computer readable medium 822 and that are executable to cause the device 800 to perform operations described herein.

The computer readable medium 822 may include or take the form of one or more non-transitory, computer-readable storage media that can be read or accessed by at least one processor 810. The one or more computer-readable storage media can include volatile and/or non-volatile storage components, such as optical, magnetic, organic or other memory or disc storage, which can be integrated in whole or in part with at least one of the one or more processors 810. In some embodiments, the computer readable medium 822 can be implemented using a single physical device (e.g., one optical, magnetic, organic or other memory or disc storage unit), while in other embodiments, the computer readable medium 822 can be implemented using two or more physical devices.

Communication interface 830 may be operated in accordance with program instructions 824, such as instructions for sending and/or receiving information via a wireless antenna, which may be disposed on or in the device 800. The communication interface 830 can optionally include one or more oscillators, mixers, frequency injectors, etc. to modulate and/or demodulate information on a carrier frequency to be transmitted and/or received by the antenna. In some examples, the device 800 is configured to indicate an output from the processor 810 by modulating an impedance of the antenna in a manner that is perceivable by a remote server or other remote computing device.

A. Sensor(s)

Sensor 812 could include a component configured to detect one or more properties of an environment proximate to the sensor 812 (e.g., skin of an external body surface of a wearer of the device 800) and/or of energy or matter received from the proximate environment. As described above, the sensor 812 may include any component or components capable of detecting at least one property, which could include any properties that may relate to the environment being analyzed by the device (e.g., the body of the wearer or a subsection thereof). For example, the sensor 812 could be configured to measure blood pressure, pulse rate, blood oxygenation, ambient light intensity, skin temperature, etc. In some examples, the sensor 812 may include one or more of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., magnetic resonance) sensor. In examples wherein the sensor 812 includes a light sensor, the light sensor could be a photodiode, a photomultiplier, a CCD, a photocell, a photoresistive element, a camera, or any other sensor or sensors configured to detect one or more properties of light emitted by color centers of the functionalized nanodiamonds.

The sensor 812 could additionally include a light source or other energy emitter for transmitting illumination or other energy that can illuminate and/or penetrate the environment to illuminate, excite, or otherwise affect one or more elements of interest in the environment proximate to the sensor 812 (e.g., a fluorescent contrast agent configured to bind to an analyte of interest in blood of a wearer of the device 800). The wavelength of transmitted illumination could be specified to penetrate biological tissues of a wearer; for example, the transmitted illumination could have a wavelength within a near-infrared (NIR) transparency window of biological tissue. The wavelength of the transmitted illumination could be specified to be a wavelength that causes fluorescence and/or emission of light by fluorophores, chromophores, or other elements of interest. An energy emitter of the sensor 812 could be configured to produce other forms of energy toward the environment proximate to the sensor 812 that could result in emission, reflection, scattering or some other generation of light or other energy or matter by other chemicals, imaging agents, biological elements, or other analytes proximate to the sensor 812.

B. Power System

The power supply circuit 814 can provide power to the electronics of the device 800 using energy from the rechargeable battery 816, such as by coupling the electronics to a power supply path. In addition, in response to a control signal from the control circuit 818, the power supply circuit 814 can discharge the electronics of the device 800 by coupling the electronics to a discharge path. The charging circuit 820 can be configured to receive power from an external power source, such as a wireless charger or an electrical connector plugged into a charging port of the device 800. The charging circuit 820 can also regulate and/or rectify electrical energy received from the external power source and use the received energy to apply a charging current to the rechargeable battery 816. In addition, the charging circuit 820 may be configured to use feedback from the rechargeable battery 816, such as a temperature, discharge state, etc., as a basis for regulating the charging current applied to the rechargeable battery 816.

The charging circuit 820 may include (or be connected to) a coil configured to receive electromagnetic energy. In some examples, the power supply 820 may include one or more other energy harvesting and/or energy receiving devices, such as a photovoltaic cell, or an electrical terminal for plugging in to a DC power source (e.g., to recharge the rechargeable battery 816). The charging circuit 820 can also provide an output to the control circuit 818, which indicates a change in power being applied to the charging circuit 820. Thus, a change in power applied to the charging circuit 820 can result in an indication, to the control circuit 818, such as connection to the control circuit 818 transitioning from a first voltage to a second voltage.

Rechargeable battery 816 is configured to power the device 800 using stored electrochemical energy and to be recharged multiple times. The rechargeable battery 816 could include one or more of a variety of rechargeable battery chemistries, including lead-acid, nickel-metal-hydride, nickel-cadmium, lithium-ion, lithium-polymer, or some other rechargeable battery chemistry. The rechargeable battery 816 could include one or more thermistors that the processor(s) 810, the power supply circuit 814, the charging circuit 820, or some other component of the device 800 could operate to determine a temperature of the rechargeable battery 816 and to prevent damage of the rechargeable battery 816 by reducing a charging rate, a discharging rate, or some other property of use of the rechargeable battery 816.

The control circuit 818 is configured to apply a control signal to the power supply circuit 814 that causes the power supply circuit 814 to discharge the electronics of the device 800 (i.e., the processor 810, sensor 812, computer readable medium 822, user interface 828, and communication interface 830) by coupling the electronics to the discharge path. The control circuit 818 applies the control signal in response to detecting a change in power applied to the charging circuit 820 from an external power source. The control circuit 818 applies the control signal for a period of time and then ceases to apply the control signal, which causes the power supply circuit 814 to couple the electronics to the power supply path. Upon being reconnected to the power supply path, the device 800 undergoes a power-on reset in which the processor 810 executes a power-on routine (e.g., in accordance with the program instructions 824). The power-on routine may involve clearing temporary memory and/or buffers, calibrating the sensors 812, initiating communication with a remote device via the communication interface 830, and/or other processes.

VI. Alternative Embodiments

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

In some examples, an individual user or a group of users may create a data-based "user-account," which may also be referred to simply as an "account." A user-account for a particular user or user group may include data related to the particular user or user group, which the user or user group has opted to provide for the user-account. As such, a particular user's account may, in a sense, be a data-based representation of that particular user. A user may create an account for various applications, web sites, and/or online services, for instance. Examples of user accounts include e-mail accounts, social network accounts, online financial accounts, accounts with service providers, among other possibilities. Further, in some cases, a user may have a single user-account that provides as a data-based representation of the user for multiple services, websites, applications, etc. For instance, a user could opt to use their e-mail account or social network account as a common login for various online services and applications, which are provided by a number of different entities. Further, a user of a computing device, such as a mobile phone, laptop computer, or wearable computing device, may associate their user-account with the computing device itself, such that while the user is operating the computing device, their account will be associated with applications that are provided on the computing device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content serer that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An electronic device comprising:
   a power supply circuit;
   an energy storage device configured to power a load via the power supply circuit, wherein the power supply circuit is configured to selectively couple the load to (i) a power supply path through which the power supply circuit uses the energy storage device to power the load and (ii) a discharge path that discharges the load;
   a charging circuit, wherein the charging circuit is configured to charge the energy storage device with power applied to the charging circuit from a power source; and
   a control circuit comprising:
   a switch; and
   one or more passive circuit elements coupled to the switch,
   wherein the charging circuit is configured to provide a voltage to the control circuit based on a change in power provided to the charging circuit, wherein providing the voltage to the control circuit produces a time-varying voltage at the switch for a period of time that places the switch in a high-conductance state during an initial portion of the period of time and a low-conductance state during a subsequent portion of the period of time, wherein a duration of the initial portion of the period of time is controlled at least in part by a capacitance and a resistance of the one or more passive circuit elements, and
   wherein the control circuit is configured to: (i) apply a control signal to the power supply circuit for the period of time, wherein the power supply circuit is configured to, in response to the control circuit applying the control signal, couple the load to the discharge path so as to discharge the load during the period of time, and (ii) following the period of time, cease to apply the control signal to the power supply circuit, wherein the power supply circuit is configured to, in response to the control circuit ceasing to apply the control signal, couple the load to the power supply path.

2. The device of claim 1, wherein the one or more passive circuit elements comprise a resistor and a capacitor coupled to the switch, and wherein the duration of the initial portion of the period of time is controlled at least in part by a resistance of the resistor and a capacitance of the capacitor.

3. The device of claim 2, wherein the switch is a transistor, and wherein the resistor and the capacitor are coupled to a gate terminal of the transistor.

4. The device of claim 2, wherein the resistor and the capacitor coupled to the switch are a first resistor and a first capacitor, wherein the one or more passive circuit elements further comprise a second resistor and a second capacitor coupled to the switch, and wherein a duration of the subsequent portion of the period of time is controlled at least in part by a resistance of the second resistor and a capacitance of the second capacitor.

5. The device of claim 4, wherein the switch is a transistor, and wherein the second resistor and the second capacitor are coupled to a drain terminal of the transistor.

6. The device of claim 4, wherein during the initial portion of the period of time the second capacitor discharges through the switch, and wherein the second resistor is further coupled to a voltage source such that during the subsequent portion of the period of time the voltage source charges the second capacitor through the second resistor.

7. The device of claim 1, wherein the load comprises a microprocessor, and wherein the microprocessor is configured to perform a power-up reset in response to the power supply circuit coupling the load to the power supply path.

8. A method comprising:
providing, by a charging circuit, a voltage to a control circuit based on a change in power provided to the charging circuit, wherein the charging circuit is configured to charge an energy storage device configured to power a load via a power supply circuit, wherein the power supply circuit is configured to selectively couple the load to (i) a power supply path through which the power supply circuit uses the energy storage device to power the load and (ii) a discharge path that discharges the load, wherein the control circuit comprises (i) a switch and (ii) one or more passive circuit elements coupled to the switch, wherein the charging circuit providing the voltage to the control circuit produces a time-varying voltage at the switch for a period of time that places the switch in a high-conductance state during an initial portion of the period of time and a low-conductance state during a subsequent portion of the period of time, wherein a duration of the initial portion of the period of time is controlled at least in part by a resistance and a capacitance of the one or more passive circuit elements;
applying, by the control circuit, a control signal to the power supply circuit for the period of time;
in response to the control circuit applying the control signal, the power supply circuit coupling the load to the discharge path so as to discharge the load during the period of time;
following the period of time, the control circuit ceasing to apply the control signal to the power supply circuit; and
in response to the control circuit ceasing to apply the control signal, the power supply circuit coupling the load to the power supply path.

9. The method of claim 8, wherein the one or more passive circuit elements comprise a resistor and a capacitor coupled to the switch, and wherein the duration of the initial portion of the period of time is controlled at least in part by a resistance of the resistor and a capacitance of the capacitor.

10. The method of claim 8, wherein the switch is a transistor, wherein the one or more passive circuit elements are coupled to a gate terminal of the transistor, and wherein the charging circuit providing the voltage to the control circuit comprises the charging circuit providing the voltage to the one or more passive circuit elements, thereby producing the time-varying voltage at the gate of the transistor.

11. The method of claim 9, wherein the resistor and the capacitor coupled to the switch are a first resistor and a first capacitor, wherein the one or more passive circuit elements further comprise a second resistor and a second capacitor coupled to the switch, and wherein a duration of the subsequent portion of the period of time is controlled at least in part by a resistance of the second resistor and a capacitance of the second capacitor.

12. The method of claim 11, wherein during the initial portion of the period of time the second capacitor discharges through the switch, and wherein the second resistor is further coupled to a voltage source such that during the subsequent portion of the period of time the voltage source charges the second capacitor through the second resistor.

13. The method of claim 11, wherein the switch and the second capacitor are coupled to the power supply circuit, and wherein the control circuit applying the control signal to the power supply circuit for the period of time comprises (i) during the initial portion of the period of time, the control circuit applying a voltage below a threshold value to the power supply circuit via the switch in the high-conductance state and (ii) during the subsequent portion of the period of time while the switch is in the low-conductance state, charging the second capacitor until the voltage applied to the power supply circuit exceeds the threshold value.

14. The method of claim 8, wherein the charging circuit is configured to (i) while power is applied to the charging circuit from a power source, provide a first voltage to the control circuit, and (ii) while power is not applied to the charging circuit from the power source, provide a second voltage to the control circuit, and wherein the charging circuit providing the voltage to the control circuit based on the change in power provided to the charging circuit comprises the charging circuit transitioning between providing the first voltage and providing the second voltage.

15. The method of claim 8, wherein the load comprises a microprocessor, and wherein the microprocessor is configured to perform a power-up reset in response to the power supply circuit coupling the load to the power supply path.

16. An electronic device comprising:
a power supply circuit;
an energy storage device configured to power a load via the power supply circuit, wherein the power supply circuit is configured to selectively couple the load to (i) a power supply path through which the power supply circuit uses the energy storage device to power the load and (ii) a discharge path that discharges the load;
a charging circuit, wherein the charging circuit is configured to charge the energy storage device with power applied to the charging circuit from a power source; and
a control circuit comprising:
a switch;
a first set of one or more passive circuit elements coupled to the switch; and
a second set of one or more passive circuit elements coupled to the switch;
wherein the control circuit is configured to: (i) receive an indication of a change in power provided to the charging circuit, (ii) in response to receiving the indication from the charging circuit, apply a control signal to the power supply circuit for a period of time, wherein the period of time is controlled at least in part by a first capacitance of the first set of one or more passive circuit elements and a second capacitance of the second set of one or more passive circuit elements, wherein the power supply circuit is configured to, in response to the control circuit applying the control signal, couple the load to the discharge path so as to discharge the load during the period of time, and (iii) following the period of time, cease to apply the control signal to the power supply circuit, wherein the power supply circuit is configured to, in response to the control circuit ceasing to apply the control signal, couple the load to the power supply path.

17. The device of claim 16, wherein the control circuit receiving the indication of the change in power provided to the charging circuit comprises the control circuit receiving a signal that produces a time-varying voltage at the switch, wherein the produced time-varying voltage places the switch in a high-conductance state during an initial portion of the period of time and places the switch in a low-conductance state during a subsequent portion of the period of time.

18. The device of claim 17, wherein a duration of the initial portion of the period of time is controlled at least in part by the first capacitance of the first set of one or more passive circuit elements, and wherein a duration of the subsequent portion of the period of time is controlled at least in part by the second capacitance of the second set of one or more passive circuit elements.

19. The device of claim 16, wherein the charging circuit is configured to (i) while power is not applied to the charging circuit from a power source, provide a first voltage to the control circuit, and (ii) while power is applied to the charging circuit from the power source, provide a second voltage to the control circuit, and wherein the indication of the change in power provided to the charging circuit comprises a transition between the first voltage and the second voltage.

20. The device of claim 16, wherein the load comprises a microprocessor, and wherein the microprocessor is configured to perform a power-up reset in response to the power supply circuit coupling the load to the power supply path.

* * * * *